United States Patent
Loeffler et al.

(10) Patent No.: US 8,034,980 B2
(45) Date of Patent: Oct. 11, 2011

(54) METHOD FOR PRODUCING POLYETHER POLYOLS

(75) Inventors: Achim Loeffler, Speyer (DE); Wolfgang Loth, Bad Duerkheim (DE); Ralf Boehling, Lorsch (DE); Thomas Ostrowski, Mannheim (DE); Michael Stoesser, Neuhofen (DE); Hartwig Voss, Frankenthal (DE); Axel Schimpf, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/302,162

(22) PCT Filed: May 22, 2007

(86) PCT No.: PCT/EP2007/054960
§ 371 (c)(1),
(2), (4) Date: Nov. 24, 2008

(87) PCT Pub. No.: WO2007/135154
PCT Pub. Date: Nov. 29, 2007

(65) Prior Publication Data
US 2009/0203874 A1  Aug. 13, 2009

(30) Foreign Application Priority Data
May 23, 2006  (EP) .................... 06114369

(51) Int. Cl.
*C07C 43/00* (2006.01)
*B01J 19/00* (2006.01)

(52) U.S. Cl. ........ 568/620; 568/606; 568/619; 568/621; 568/679; 568/680; 526/88; 422/131; 422/135; 422/137; 422/138

(58) Field of Classification Search .................. 568/606, 568/619, 620, 621, 679, 680; 526/88; 422/131, 422/138, 137, 135
See application file for complete search history.

(56) References Cited

U.S. PATENT DOCUMENTS

| | | |
|---|---|---|
| 2002/0032121 A1 | 3/2002 | Grosch et al. |
| 2003/0199670 A1 | 10/2003 | Grosch et al. |
| 2004/0073069 A1 * | 4/2004 | Heider et al. .............. 568/672 |
| 2004/0156762 A1 | 8/2004 | Schuppich et al. |
| 2005/0245628 A1 | 11/2005 | Hubel et al. |
| 2006/0087917 A1 * | 4/2006 | Ehrfeld et al. .............. 366/340 |

FOREIGN PATENT DOCUMENTS

| | | |
|---|---|---|
| EP | 1 586 372 A1 | 10/2005 |
| WO | WO 00/74845 A1 | 12/2000 |
| WO | WO 02/09866 A2 | 2/2002 |

OTHER PUBLICATIONS

C. Amador, et al., "Flow distribution in different microreactor scale-out geometries and the effect of manufacturing tolerances and channel blockage", Chemical Engeneering Journal, 101, 2004, pp. 379-390.
Michael W. Edens, et al., "Applications of Block Copolymer Surfactants", Developments in Block Copolymer Science and Technology, XP-001233807, 2004, pp. 326-340.
U.S. Appl. No. 12/446,460, filed Apr. 21, 2009, Boehling et al.
U.S. Appl. No. 12/681,789, filed Apr. 6, 2010, Grosch et al.
U.S. Appl. No. 12/992,492, filed Nov. 12, 2010, Freidank et al.
U.S. Appl. No. 12/935,443, filed Sep. 29, 2010, Mattmann et al.
U.S. Appl. No. 12/867,503, filed Aug. 13, 2010, Birnbach et al.

* cited by examiner

*Primary Examiner* — Milton I Cano
*Assistant Examiner* — Michael L Leonard
(74) *Attorney, Agent, or Firm* — Oblon, Spivak, McClelland, Maier & Neustadt, L.L.P.

(57) ABSTRACT

A process for preparing polyether polyols by reaction of the following starting materials:
  a) one or more alkylene oxides and, if appropriate, carbon dioxide and also
  b) one or more H-functional starter substances,
in the presence of a catalyst,
in a reaction unit
having a plurality of parallel layers A, B which are microstructured so that each layer has a multiplicity of channels which are arranged parallel to one another and form a continuous flow path from one side of the plate to the opposite side of this, wherein a distribution device for introduction of the starting materials and the catalyst is provided at one end of the channels of the layers A and a collection device for the reaction mixture is provided at the other end of these is proposed.

23 Claims, No Drawings

METHOD FOR PRODUCING POLYETHER POLYOLS

"This application is a U.S. National Phase application under 35 U.S.C. §371 of PCT Application No. PCT/EP2007/054960, filed 05/22/2007, which claims priority under 35 U.S.C. §119 (a)-(d) of European Patent Application No. 06114369.9, filed 05/23/2006.

The invention relates to a process for preparing polyether polyols in a reaction unit having a plurality of parallel layers which are microstructured.

Polyether polyols are, in particular, raw materials for the production of polyurethanes.

EP-A 1 586 372 describes a microstructured reactor and its use in a process for preparing polyether alcohols by a ring-opening addition reaction of short-chain alkylene oxides in the presence of a solid catalyst, with the chemical process taking place in spaces which are formed by two or more essentially parallel plates or layers and mixing of the starting materials occurring individually in a single liquid phase in each reaction channel, a heat exchange apparatus being provided and the reactor being operated at pressures of up to 800 bar and temperatures in the range from 30 to 400° C. In this way, the potential of very high reaction rates resulting from high alkylene oxide pressures can be optimally utilized and polyether alcohols of uniform quality and having a low content of by-products can be prepared.

However, microstructured apparatuses are very difficult structures; even in manufacture, the tolerances are such that, especially for reaction systems having an appreciably increasing viscosity over the reaction time, as is the case in the present preparation of polyether polyols, the pressure drop in the individual capillaries relative to one another leads to maldistribution of the mass flows. This problem is comprehensively described by C. Amador et al. in Chem. Eng. J. 101 (2004) 1-3, pages 379-390. The avoidance of maldistributions in tube apparatuses connected in parallel was studied as early as the 1980s. Approaches which promote equal distribution even in the case of viscosity-increasing systems have been developed. In the same way as the pressure drops in the individual capillaries have to be taken into account in the feeding of starting materials into the microstructured reactor, this effect also has to be taken into account in the introduction of further material.

In addition, the process for preparing polyether polyols requires very high pressures, which force a reactor design capable of withstanding up to several hundred bar.

In the light of this, it was an object of the invention to provide a process for preparing polyether polyols in a microstructured reactor, which process is improved compared to known processes and, in particular, avoids or reduces maldistribution of the mass flows.

This object is achieved by a process for preparing polyether polyols by reaction of the following starting materials:
  a) one or more alkylene oxides and, if appropriate, carbon dioxide and also
  b) one or more H-functional starter substances,
  in the presence of a catalyst in a reaction unit having a plurality of layers A, B which are arranged in parallel above one another and are microstructured so that each layer has a multiplicity of channels which are arranged parallel to one another and form a continuous flow path from one side of the plate to the opposite side of this, in which part of the starting materials or all starting materials and, if appropriate, the catalyst are premixed at a temperature below the temperature of the reaction in a mixer outside the channels and the mixture is subsequently fed into the channels in the layers A on one side of this and the reaction mixture is taken off on the other side of this and a heat transfer medium is fed into the channels of planes B arranged alternately to the planes A on one side of these and is taken off again on the other side of these, wherein a distribution device for introduction of the starting materials and the catalyst is provided at one end of the channels of the planes A and a collection device for the reaction mixture is provided at the other end of these.

The preparation of the polyether polyols in the process of the invention is carried out by reaction of the following starting materials:
  a) one or more alkylene oxides and, if appropriate, carbon dioxide and also
  b) one or more H-functional starter substances,
in the presence of a catalyst.

As starting materials a), it is possible to use all known alkylene oxides. Preference is given to using one or more substances selected from the following listing: ethylene oxide, propylene oxide, butylene oxide, pentene oxide, glycidyl ether, hexene oxide and styrene oxide, preferably ethylene oxide, propylene oxide, carbon dioxide, and mixtures thereof. In the case of butylene oxide, pentene oxide and hexene oxide, all isomers can be used in pure form or as mixtures of the isomers.

Carbon dioxide is preferably used in an amount of up to 25% by weight, based on the weight of the polyether alcohol.

As H-functional starter substance or substances, preference is given to using one or more alcohols having a functionality of from 1 to 8, preferably from 2 to 8, particularly preferably from 2 to 6, more preferably from 2 to 4.

One or more substances from the following listing can be used for this purpose: ethylene glycol, propylene glycol, diethylene glycol, dipropylene glycol, glycerol, trimethylolpropane, pentaerythritol, sucrose, saccharose, glucose, fructose, mannose, sorbitol, hydroxyalkylated (meth)acrylic acid derivatives and alkoxylated derivatives of the abovementioned H-functional starter substances up to a molecular weight of about 1500 D. Furthermore, primary and/or secondary amines and also thiols can serve as starters. It is possible to use compounds which comprise both OH and also allyl or vinyl groups, for example allyl alcohol and its etherification products with polyhydric alcohols, and which can serve as starting materials in a subsequent free-radical polymerization.

As H-functional starter substance or substances, it is also possible to use one or more alcohols having a functionality of 1 and having the general formula R—OH, where R is a saturated or unsaturated alkyl, aryl, aralkyl or alkylaryl radical having from 1 to 60, preferably from 1 to 24, carbon atoms, in particular one or more substances from the following listing: methanol, butanol, hexanol, heptanol, octanol, decanol, undecanol, dodecanol or tridecanol, tetradecanol, pentadecanol, hexadecanol, heptadecanol, octadecanol, butenol, hexenol, heptenol, octenol, nonenol, decenol, undecenol, vinyl alcohol, allyl alcohol, geraniol, linalool, citronellol, phenol or nonylphenol. As alkylaryl radicals, particular preference is given to those having $C_4$-$C_{15}$-alkyl groups.

As catalysts, it is possible to use, in particular, multimetal cyanide complex catalysts or alkali metal and alkaline earth metal hydroxides, preferably potassium hydroxide and cesium hydroxide, and also other basic catalysts such as alkali metal alkoxides or amines. Apart from soluble basic catalysts, it is also possible to use insoluble basic catalysts such as magnesium hydroxide or hydrotalcite. Furthermore, Brön- sted-acid catalysts, e.g. montmorillonite, or Lewis-acid catalysts, e.g. boron trifluoride, are also suitable.

Suitable multimetal cyanide complex catalysts are, in particular, double metal cyanide catalysts (DMCs) which are known and are described, for example, in WO 01/083107. They usually have the general formula (I)

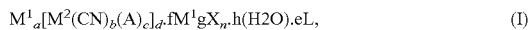

$$M^1_a[M^2(CN)_b(A)_c]_d \cdot fM^1gX_n \cdot h(H_2O) \cdot eL, \quad (I)$$

where $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $M^2$ is a metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$, and $M^1$ and $M^2$ are identical or different, A is an anion selected from the group consisting of halide, hydroxide, sulfate, carbonate, cyanide, thiocyanate, isocyanate, cyanate, carboxylate, oxalate and nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alcohols, aldehydes, ketones, ethers, polyethers, esters, ureas, amides, nitriles, lactones, lactams and sulfides, and a, b, c, d, g and n are selected so that the compound is electrically neutral and e is the coordination number of the ligand or 0, f is a fraction or integer greater than or equal to 0 and h is a fraction or integer greater than or equal to 0.

The preparation of these compounds is carried out by generally known methods, by combining the aqueous solution of a water-soluble metal salt with the aqueous solution of a hexacyanometalate, in particular a salt or an acid, hereinafter also referred to as starting solutions, and, if appropriate, adding a water-soluble ligand thereto during or after combination of the solutions. Such catalysts and their preparation are described, for example, in EP 862,947 and DE 197,42,978.

The multimetal cyanide compounds preferably have a crystalline structure. Their particle size is preferably in the range from 0.1 to 100 μm. A particular advantage of crystalline DMC catalysts, in particular those which have been prepared using cyanometalic acid, is their relatively high catalytic activity. As a result, the preparation of the polyether alcohols can be carried out using a smaller amount of catalyst. The amount used in this case usually corresponds to the amount of multimetal cyanide compounds in the finished polyether alcohol. The complicated removal of multimetal cyanide compounds from the polyether alcohol after the preparation can thus be dispensed with. However, it is also possible to use a larger amount of multimetal cyanide compounds and to reduce the amount of the multimetal cyanide compound in the polyol after the synthesis of the polyether alcohol to such an extent that the polyether alcohol comprises the amount of multimetal cyanide compounds desired for further processing.

The multimetal cyanide compounds are preferably used in the form of suspensions in which the multimetal cyanide compounds are suspended in organic compounds, preferably alcohols. In the process of the invention, one possibility is to disperse the catalysts either in an intermediate or in the end product of the synthesis. The catalyst suspension should have a concentration in the range from 0.5 to 10%.

The DMC catalysts are highly active. DMC catalysts have hitherto been used first and foremost in semibatch reactors or continuous backmixed reactors (generally stirred tank reactors). However, this reactor concept does not take account of the possible high reaction rate of the DMC catalysts; rather, the maximum reaction rate is frequently limited by the limited heat removal rate of these types of reactor, with both reactors having internal cooling coils and those having external heat exchangers being limited. The consequence is that the reaction can no longer be carried out at a constant temperature at high alkylene oxide introduction rates, which can be particularly critical in the preparation of polyethers for polyurethane applications since, firstly, undesirable odorous substances can occur as a result of thermal decomposition reactions and, secondly, a deterioration in the foam properties can occur as a result of the partially damaged alkylene oxide chains.

The concentration of the catalysts is, if they are multimetal cyanide complex catalysts, frequently in the range from 5 to 5000 ppm, based on the total weight of the starting materials, depending on the H-functional starter substances used.

Alkali metal alkoxides as catalysts are usually used in higher concentrations of, for example, from 100 to 50 000 ppm, based on the total weight of the starting materials.

If the reaction is carried out in the presence of multimetal cyanide complex catalysts, it is advantageous to use, together with or in place of the alcohols mentioned as H-functional starter substances, their reaction products with alkylene oxides, in particular with propylene oxide, preferably reaction products having a molar mass up to 500 g/mol. Here, the addition reaction of the alkylene oxides to produce the reaction products can be carried out using any catalysts, for example, basic or Lewis-acid catalysts.

It is possible either to use only a single alkylene oxide as starting material a) or to use a plurality of alkylene oxides, in which case either a blockwise arrangement in which the alkylene oxides are added on individually in succession or a random arrangement in which the alkylene oxides are introduced together is possible. Mixed forms in which both blockwise and random sections are incorporated into the polyether chain are also possible.

The starting materials are preferably used in a ratio of 1-300 equivalents of starting materials a) (one or more alkylene oxides and, if appropriate, carbon dioxide) to starting materials b) (one or more H-functional starter substances).

In the process of the invention, part of the starting materials or all starting materials and, if appropriate, the catalyst are firstly premixed outside the channels, with it being ensured that the temperature during premixing is lower than the temperature of the subsequent reaction.

As mixer which is located outside the reactor and in which part of the starting materials or all starting materials and, if appropriate, the catalyst are premixed, preference is given to using a microstructured mixer.

Mixers suitable for this purpose are, for example, laminar diffusion mixers, multilamination mixers, micromixers having structured walls or split-recombine mixers.

In laminar diffusion mixers, the mixing of substreams of the fluid which has been divided into a multiplicity of microscopically small flow lamellae having a thickness in the range from 10 to 2000 μm or from 20 to 1000 μm or from 40 to 500 μm on a microstructure occurs exclusively by molecular diffusion perpendicular to the main flow direction. An approximate design of the mixer can be effected via the Fourier number $Fo=t/t_D$. If the residence time t is at least in the order of magnitude of the diffusion time $t_D$ for transverse mixing, i.e. if the Fourier number is at least 1, virtually complete molecular mixing is achieved at the outlet of the mixer.

Laminar diffusion mixers can be configured as simple T- or Y-mixers or as multilamination mixers. In the case of a T- or Y-mixer, the two substreams to be mixed are fed via a T- or Y-shaped arrangement into a single channel. A critical parameter for determining the transverse diffusion path $S_{diff}$ is the channel width dc. For typical channel widths in the range from 100 µm to 1 mm, very short mixing times of less than 100 ms are obtained for gases, while the mixing times are in the range of minutes for liquids. In the case of mixing of liquids, as in the present process, it is advantageous to additionally support the mixing process, for example by means of flow-induced transverse mixing.

In multilamination mixers, the substreams to be mixed are geometrically divided in a divider into a multiplicity of flow threads and are then fed alternately into lamellae of the mixing section at the outlet of the divider. In the case of liquids, mixing times in the range of seconds are achieved in classical multilamination mixers. Since this is not sufficient for some applications (e.g. in the case of fast reactions), the basic principle has been developed further so that the flow lamellae are additionally focused geometrically or hydrodynamically. Geometric focusing is achieved by means of a constriction in the mixing section and hydrodynamic focusing is achieved by means of two lateral streams which flow perpendicularly into the main stream and thus further compress the flow lamellae. The focusing described allows lateral dimensions of the flow lamellae of a few microns to be achieved, so that even liquids can be mixed within a few 10 s of microseconds.

In micromixers having structured walls, secondary structures, for example flutes or ridges, are arranged on the channel walls at a particular angle to the main flow direction, preferably 45° or 90°.

Split-recombine mixers have stages of recurring separation and combination of streams. In each of these stages, the number of lamellae is successively doubled and the thickness of the lamellae and the diffusion path are thereby halved.

It can be advantageous firstly to premix an alkylene oxide, for example propylene oxide, and the catalyst, for example, a multimetal cyanide complex catalyst, and only to add the H-functional starter substance or substances in a second mixing step.

The residence time in the premixing step is preferably in the range from 1 to 300 seconds.

The premixed starting materials are fed to a reaction unit which comprises a plurality of parallel microstructured layers of reaction channels and cooling/heating channels which are arranged alternately above one another so that each layer has a multiplicity of parallel channels which form a continuous flow path from one side of the layer to the opposite side of this.

Here, a layer is a largely two-dimensional structural element extending over an area, i.e. a structural element whose thickness is negligibly small relative to its area. It is preferably an essentially flat plate.

The layers, in particular plates, are microstructured by having channels through which reaction mixture flows (reaction channels) or heat transfer medium flows (cooling/heating channels). The term microstructured indicates, as is customary, that the mean hydraulic diameter of the channels is $\leq 1$ mm.

After premixing of part or all of the starting materials, the mixture obtained and, if appropriate, additional starting materials which have not been mixed therewith are fed into the channels in the layers A on one side of these and the reaction mixture is taken off on the other side of these.

Layers B to which a heat transfer medium is fed on one side of these and is taken off on the other side of these are arranged alternately to the layers A through which the reaction mixture flows. Here, it is possible for the alternating arrangement of the layers A, B to be such that each layer A is followed by a plane B or so that each two successive layers A are followed by a layer B or so that each two successive layers B are followed by a layer A.

According to the invention, a distribution device for introduction of the starting materials and the catalyst is provided at one end of the channels of the layers A and a collection device for the reaction mixture is provided at the other end of these.

In one embodiment, the distribution and collection devices are each configured as a chamber arranged outside or within the stack of the layers A, B. The walls of the chamber can be straight or, for example, have a semicircular curve. It is important that the geometric shape of the chamber is suitable for creating flow and pressure drop conditions so that uniform flow through the channels is achieved.

In one embodiment, the distribution and collection devices are each arranged within the stack of the layers A, B by the parallel channels of each layer A having a transverse channel connecting the parallel channels arranged in the region of each of the two ends of these and all transverse channels within the stack of the layers A, B being connected by a collection channel arranged essentially perpendicular to the plane of the layers A, B. The same basic requirement of uniform distribution as indicated in the previous paragraph applies to these channels.

In one embodiment, a distribution device and a collection device corresponding to the distribution and collection devices for the layers A are also provided for the layers B through whose channels the heat transfer medium flows.

The process is preferably operated so that the pressure in the channels of the layers A is in the range from 10 to 200 bar absolute, the temperature is in the range from 60 to 200° C. and the residence time of the reaction mixture is in the range from 1 to 600 seconds. In one process variant, the process is carried out at a pressure of less than 60 bar.

It is advantageous to carry out the process so that a temperature profile is established along the channels of each layer A by two or more heating or cooling zones per layer with at least one distribution device and at least one collection device per heating or cooling zone of the layers B being provided for appropriate heating/cooling of the reaction mixture in the channels of the layers A.

If the reaction is carried out using DMC catalysts, it is, in one embodiment, advantageous to recycle the reaction mixture from the collection device of the layers A to a mixer located upstream of the reactor. Preference is given to recycling a proportion of from 0.01 to 75% by weight of the reaction mixture to a mixer located upstream of the reaction unit. In this way, it is possible to achieve a significant increase in the reaction rate and a reduction in the residence time, so that a higher productivity can frequently be achieved.

If starter substances which have been reacted with propylene oxide in a preceding reaction and have molecular weights of less than 1000 dalton are used from the beginning, the reaction proceeds very quickly and steadily and is independent of all or only slightly dependent on the order of addition of the starting materials or recirculation of products.

The process is advantageously carried out continuously.

The invention also provides a process for preparing polyetherols by reaction of the following starting materials:

a) one or more alkylene oxides and, if appropriate, carbon dioxide and also
b) one or more H-functional starter substances
in the presence of a catalyst,
in block operation with
two or more reaction units corresponding to the above definition being provided, wherein
1) the starting materials a) and b) are fed to a first reaction unit to give a first reaction mixture,
2) the first reaction mixture is preferably cooled/heated after leaving the first reaction unit,
3) one or more further starting materials different from the starting materials introduced in process step 1) or the same starting materials as in process step 1) in a mixing ratio different from that in process step 1) are mixed in to give a second reaction mixture and the second reaction mixture
4) is fed to a second reaction unit,
and the reaction mixture obtained therefrom is, if appropriate, fed to a further reaction unit, with the process steps 2) and 3) being repeated an appropriate number of times.

In one process variant, a multimetal cyanide complex catalyst is used as catalyst. In this case, the reaction product mixture from the single reaction unit or the last of the plurality of reaction units is fed to a membrane separation unit and separated into a catalyst-rich stream (retentate) and a catalyst-free stream (permeate or filtrate). An increase in the concentration of the catalyst by, in particular, a factor of from 2 to 100 is possible by means of the membrane process. The catalyst concentrate is recycled to the reactor, with small amounts, in particular in the range from 0.1 to 3%, being discharged in order to avoid accumulation of residues. The filtrate (product) is taken from the reaction system.

Suitable membrane processes are microfiltration or crossflow filtration and ultrafiltration. The membranes used have pore diameters in the range from 1 nm to 1 μm, preferably from 2 nm to 0.1 μm. The separation layers of the filter membranes can comprise, for example, organic polymers, ceramic, metal, carbon or combinations thereof and have to be stable in the reaction medium at the process temperature. Preference is given to inorganic membranes. For mechanical reasons, the separation layers are generally applied to a single-layer or multilayer porous substructure which consists of the same material as the separation layer or at least one different material. Examples are:

| Separation layer | Substructure (coarser than separation layer) |
|---|---|
| Metal | Metal |
| Ceramic | Metal, ceramic or carbon |
| Polymer | Polymer, metal, ceramic or ceramic on metal |
| Carbon | Carbon, metal or ceramic |

As ceramic, it is possible to use, for example, $\alpha$-$Al_2O_3$, $ZrO_2$, $TiO_2$, SiC or mixed ceramic materials, and polymers which can be used are, for example, polytetrafluoroethylene, polyvinylidene fluoride, polysulfones, polyether sulfones, polyether ether ketones or polyamides.

The invention also provides for the use of the polyetherols prepared by the process described above for producing polyurethanes.

Furthermore, the invention also provides for the use of the polyetherols prepared by the process described above as: surface-active substances, laundry detergents and cleaners, mining chemicals, oilfield chemicals, textile assistants, leather processing auxiliaries, coating additives, formulation auxiliaries for crop protection agents, auxiliaries for cosmetics and personal care, formulation auxiliaries for human and animal nutrition, formulation auxiliaries for pigments, formulation auxiliaries for drugs or fuel additives.

Compared to known processes, the process of the invention achieves, in particular, further avoidance or reduction of maldistributions in the channels of a microstructured reactor. Accordingly, improvements in yields and selectivities and in product properties can be achieved by means of the process of the invention. Particularly when using DMC catalysts and low molecular weight, polyfunctional starters, the process of the invention enables complete conversion to be achieved and the content of high molecular weight by-products to be reduced compared to known processes which lead to no conversion or a very low conversion. Compared to products from known processes, the products obtained by the process of the invention have, in particular, a lower viscosity at the same molar mass.

EXAMPLES

Comparative Example 1

Under conditions of continuous flow, a DMC suspension in a trifunctional polypropylene oxide having a mean molecular weight of 3000 was introduced directly into a microreactor (crossflow reactor module having an integrated cyclone mixer from Forschungszentrum Karlsruhe (FZK, No. 1250-X-0.0) and fed individually to the channels. Catalyst agglomerates led to blockage of the channels. The reaction was incomplete. The experimental results are shown in table 1 below.

TABLE 1

| | | | | Product properties | | |
|---|---|---|---|---|---|---|
| Pressure [bar] | Temperature [° C.] | Residence time [min] | Catalyst concentration [ppm] | Viscosity [25° C. mPas] | OH number | PO conc. [%] |
| 3825 | 158 | 8 | 1050 | — | — | 91 |

Comparative Example 2

As a difference from comparative example 1, the starting materials were premixed in an upstream stirred vessel having a volume corresponding to 6 times the volume of the microreactor before being fed into the microreactor. The reaction stopped repeatedly and led to only a low conversion.

The experimental results are shown in table 2 below:

TABLE 2

| | | | | Product properties | | |
|---|---|---|---|---|---|---|
| Pressure [bar] | Temperature [° C.] | Residence time [min] | Catalyst concentration [ppm] | Viscosity [25° C. mPas] | OH number | PO conc. [%] |
| 25 | 158 | 7 | 1080 | — | — | 85 |

Example 1

The experiment described under comparative example 1 was repeated, but the starting materials were premixed continuously in two microstructured mixers, with propylene oxide and glycerol firstly being mixed in a first micromixer (multilamination mixer, LH 25, from Ehrfeld) and the catalyst subsequently being introduced in a second micromixer of the same type, and the reaction mixture was then fed via a distribution chamber into the channels of a microreactor (a crossflow reactor module having an integrated cyclone mixer, FZK, No. Nr. 1250-X-0.0). The experimental results are shown in table 3 below:

TABLE 3

| | | | | | Product properties | | |
|---|---|---|---|---|---|---|---|
| Mixer type | Pressure [bar] | Temperature [min] | Residence time [min] | Catalyst concentration [ppm] | Viscosity [25° C. mPas] | OH number | PO conc. [ppm] |
| Multi-lamination mixer LH 25, from Ehrfeld | 20 | 158 | 3 | 1050 | 2035 | 56.2 | 410 |

Example 2

The experiment described under comparative example 1 was repeated, but propylene oxide and the DMC catalyst dispersed in the product were firstly premixed in a stirred vessel having a volume corresponding to 6 times the volume of the microreactor. The reaction mixture was subsequently, as described in example 1, fed via a distribution chamber into the channels of a microreactor (FZK, No. 1250-X-0.0).

The experimental results are shown in table 4 below:

TABLE 4

| | | | | | Product properties | | |
|---|---|---|---|---|---|---|---|
| Mixer type | Pressure [bar] | Temperature [min] | Residence time [min] | Catalyst concentration [ppm] | Viscosity at 25° C. | OH number | PO conc. [ppm] |
| Dynamic mixer | 20 | 216 | 3 | 990 | 653 | 57.42 | 25 |
| (Stirred autoclave) | 20 | 170 | 3 | 420 | 1085 | 53.2 | 60 |

Example 3

With Recirculation of Product

The experiments described under comparative example 1 were repeated, but the DMC catalyst and recycled product from the microreactor were firstly premixed in a multi-lamination mixer (Ehrfeld, LH 25) and this product stream was subsequently mixed with propylene oxide and glycerol in a second mixer (Ehrfeld, LH 25). The reaction mixture was subsequently fed, as described in example 1, via a distribution chamber into the individual channels of a microreactor (FZK, No. 1250-X-0.0).

The results are shown in table 5 below:

TABLE 5

| Mixer type | Pressure [bar] | Temperature [min] | Residence time [min] | Catalyst concentration [ppm] | Product properties ||| |
|---|---|---|---|---|---|---|---|
| | | | | | Viscosity at 25° C. | OH number | PO conc. [ppm] |
| Multi-lamination mixer | 20 | 150 | 2.7 | 2200 | 617 | 56.2 | >1000 |

The examples for recovery of the catalyst by membrane crossflow filtration were carried out as follows:

The product mixture from the synthesis of a polypropylene oxide having an OH number of 53, an OH functionality of 3 and a content of 420 ppm of DMC catalyst, as is described, for example, in EP-A 892 947 or DE-A 197 42 978, was concentrated by the desired factor by means of ceramic tube membranes from Atech Innovation GmbH having an external diameter of 10 mm, an internal diameter of 6 mm and a length of 1000 mm and a membrane coating on the inner wall of the tube in order to obtain a recyclable suspension and the specific permeate fluxes were subsequently determined under the conditions indicated below. In examples 4 to 8, membranes having, in each case, different separation layers (a microfiltration membrane and an ultrafiltration membrane) as indicated for each of the examples together with the concentration achieved in each case in the suspension originally comprising 450 ppm of DMC in column 1, the temperature of the membrane crossflow filtration in column 2, the flow velocity over the membrane in column 3, the transmembrane pressure (arithmetic mean of feed pressure and retentate pressure minus the permeate pressure) in column 4, and the specific flux through the membrane in column 5.

Examples 4 to 8 show that it is possible to concentrate the suspension to concentrations which allow recycling of the suspension to the process.

Example 4

Microfiltration or Crossflow Filtration

Membrane: 100 nm $Al_2O_3$ separation layer
(separation limit: about 200 kD)

| DMC (ppm) | Temperature (° C.) | Flow velocity over the membrane (m/s) *) | Transmembrane pressure (bar) **) | Specific flux (kg/m²/h) |
|---|---|---|---|---|
| 1050 | 120 | 4 | 2 | 13 |
| 1050 | 120 | 4 | 4 | 14 |
| 1050 | 120 | 4 | 8 | 15 |

Example 5

Microfiltration or Crossflow Filtration

Membrane: 100 nm $Al_2O_3$ separation layer
(separation limit: about 200 kD)

| DMC (ppm) | Temperature (° C.) | Flow velocity over the membrane (m/s) *) | Transmembrane pressure (bar) **) | Specific flux (kg/m²/h) |
|---|---|---|---|---|
| 5000 | 120 | 4 | 4 | 14 |

Example 6

Ultrafiltration

Membrane: 20 kD $TiO_2$ separation layer
(Pore diameter: about 10 nm)

| DMC (ppm) | Temperature (° C.) | Flow velocity over the membrane (m/s) *) | Transmembrane pressure (bar) **) | Specific flux (kg/m²/h) |
|---|---|---|---|---|
| 1050 | 100 | 4 | 24 | 12 |
| 1050 | 110 | 4 | 24 | 17 |
| 1050 | 120 | 4 | 24 | 23 |
| 1050 | 130 | 4 | 24 | 29 |

Example 7

Ultrafiltration

Membrane: 20 kD TiO$_2$ separation layer
(pore diameter; about 10 nm)

| DMC (ppm) | Temperature (°C.) | Flow velocity over the membrane (m/s) * | Transmembrane pressure (bar) ** | Specific flux (kg/m$^2$/h) |
|---|---|---|---|---|
| 5000 | 120 | 4 | 4 | 10 |
| 5000 | 120 | 4 | 8 | 14 |
| 5000 | 120 | 4 | 12 | 20 |
| 5000 | 120 | 4 | 16 | 23 |
| 5000 | 120 | 4 | 20 | 25 |

Example 8

Ultrafiltration

Membrane: 20 kD TiO$_2$ separation layer
(pore diameter: about 10 nm)

| DMC (ppm) | Temperature (°C.) | Flow velocity over the membrane (m/s) * | Transmembrane pressure (bar) ** | Specific flux (kg/m$^2$/h) |
|---|---|---|---|---|
| 5000 | 130 | 1 | 32 | 47 |
| 5000 | 130 | 2 | 32 | 44 |
| 5000 | 130 | 3 | 32 | 43 |
| 5000 | 130 | 4 | 32 | 43 |

The invention claimed is:

1. A process for preparing polyether polyols by reaction of the following starting materials:
   a) one or more alkylene oxides and, optionally, carbon dioxide and also
   b) one or more H-functional starter substances,
   in the presence of a catalyst,
   in a reaction unit
   having a plurality of parallel layers A, B which are microstructured so that each layer has a multiplicity of channels which are arranged parallel to one another and form a continuous flow path from one side of the plate to the opposite side of this,
   in which part of the starting materials or all starting materials and, optionally, the catalyst are premixed at a temperature below the temperature of the reaction in a mixer outside the reactor and
   the mixture is subsequently fed into the channels in the layers A on one side of this and the reaction mixture is taken off on the other side of this and a heat transfer medium is fed into the channels of layers B arranged alternately to the layers A on one side of these and is taken off again on the other side of these,
   wherein a distribution device for introduction of the starting materials and the catalyst is provided at one end of the channels of the layers A and a collection device for the reaction mixture is provided at the other end of these,
   wherein the pressure in the channels of the layers A is in the range from 10 to 200 bar absolute, the temperature is in the range from 60 to 200° C. and the residence time of the reaction mixture is in the range from 1 to 600 seconds, and
   wherein the distribution and collection devices are configured as chambers having a geometric shape for creating flow and pressure drop conditions different from the channels each arranged within the stack of the layers A, B by the parallel channels of each layer A having a transverse channel connecting the parallel channels arranged in the region of each of the two ends of these and all transverse channels within the stack of the layers A, B being connected by a collection channel arranged essentially perpendicular to the plane of the layers A, B.

2. The process according to claim 1, wherein the layers A, B are plates.

3. The process according to claim 1, wherein the alternating arrangement of the layers A, B are such that each layer A is followed by a layer B or such that each two successive layers A are followed by a layer B or such that each two successive layers B are followed by a layer A.

4. The process according to claim 1, wherein a distribution device and a collection device corresponding to the distribution and collection devices for the layers A are provided for the layers B through whose channels the heat transfer medium flows.

5. The process according to claim 1, wherein the mixer which is located outside the reactor and in which part of the starting materials or all starting materials and, optionally, the catalyst are premixed is a microstructured mixer.

6. The process according to claim 5, wherein the microstructured mixer is a laminar diffusion mixer, a multilamination mixer, a micromixer having structured walls or a split-recombined mixer.

7. The process according to claim 1, wherein a temperature profile is established along the channels of each layer A by two or more heating or cooling zones with at least one distribution and collection device per heating or cooling zone being provided in the layers B for appropriate heating/cooling of the heat transfer medium.

8. The process according to claim 1, wherein the reaction mixture is recycled from the collection device to the mixer located upstream of the reactor.

9. A process for preparing polyether polyols by reaction of the following starting materials:
   a) one or more alkylene oxides and, optionally, carbon dioxide and also
   b) one or more H-functional starter substances
   in the presence of a catalyst,
   in block operation with
   two or more reaction units corresponding to the definition in claim 1 being provided, wherein
   1) the starting materials a) and b) are fed to a first reaction unit to give a first reaction mixture,
   2) the first reaction mixture is optionally cooled or heated after leaving the first reaction unit,
   3) one or more further starting materials different from the starting materials introduced in process step 1) or the same starting materials as in process step 1) in a mixing ratio different from that in process step 1) are mixed in to give a second reaction mixture and the second reaction mixture
   4) is fed to a second reaction unit,
   and the reaction mixture obtained therefrom is, optionally, fed to a further reaction unit, with the process steps 2) and 3) being repeated an appropriate number of times.

10. The process according to claim 1, wherein the one or more alkylene oxides and, optionally, carbon dioxide are initially premixed with the catalyst in a first mixing step in the mixer outside the reactor and the one or more H-functional starter substances are mixed in in second mixing step.

11. The process according to claim 1, wherein the starting materials a) are one or more substances selected from the following listing: ethylene oxide, propylene oxide, butylene oxide, pentene oxide, glycidyl ether, hexene oxide and styrene oxide, preferably ethylene oxide, propylene oxide, carbon dioxide and mixtures thereof.

12. The process according to claim 1, wherein one or more alcohols having a functionality of from 1 to 8 are used as H-functional starter substances.

13. The process according to claim 12, wherein one or more alcohols having a functionality of 1 and having the general formula R-OH, where R is a saturated or unsaturated alkyl, aryl, aralkyl or alkylaryl radical having from 1 to 60 carbon atoms are used as H-functional starter substance or substances.

14. The process according to claim 13, wherein one or more substances from the following listing: methanol, butanol, hexanol, heptanol, octanol, decanol, undecanol, dodecanol or tridecanol, tetradecanol, pentadecanol, hexadecanol, heptadecanol, octadecanol, butenol, hexenol, heptenol, octenol, nonenol, decenol, undecenol, vinyl alcohol, allyl alcohol, geraniol, linalool, citronellol, phenol and nonylphenol, are used as H-functional starter substance or substances.

15. The process according to claim 12, wherein one or more alcohols having a functionality of from 2 to 8 are used as H-functional starter substances.

16. The process according to claim 15, wherein one or more substances from the following listing: ethylene glycol, propylene glycol, glycerol, trimethylolpropane and pentaerythritol, are used as H-functional starter substances.

17. The process according to claim 1, wherein multimetal cyanide complex catalysts are used as catalysts.

18. The process according to claim 1, wherein basic catalysts such as potassium hydroxide, alkali metal alkoxides or amines are used as catalysts.

19. The process according to claim 17, wherein the multimetal cyanide complex catalyst is recovered by membrane crossflow filtration of the reaction product mixture from the single reaction unit or the last of the plurality of reaction units and is recycled to the process.

20. The process according to claim 1, wherein the distribution device creates at least one of (i) flow conditions and (ii) pressure drop conditions to provide uniform flow of the starting materials through the channels.

21. The process according to claim 1, wherein the distribution device introduces all of the starting materials into the channels of the layers A.

22. The process according to claim 1, wherein the distribution device is arranged within the stack of the layers A, B by the parallel channels of each layer A having a transverse channel connecting the parallel channels in at least the layers A and the transverse channels within the layers A connected by a channel arranged essentially perpendicular to the plane of the layers A.

23. The process according to claim 1, wherein each of the chambers has walls in the form of a semicircular curve.

* * * * *